US012630218B2

(12) United States Patent
Sato et al.

(10) Patent No.: US 12,630,218 B2
(45) Date of Patent: May 19, 2026

(54) TURNING CONTROL DEVICE

(71) Applicant: DENSO CORPORATION, Kariya-city (JP)

(72) Inventors: Takafumi Sato, Kariya-city (JP); Shuji Kuramitsu, Kariya-city (JP); Yuta Suzuki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 65 days.

(21) Appl. No.: 18/905,018

(22) Filed: Oct. 2, 2024

(65) Prior Publication Data

US 2025/0026403 A1 Jan. 23, 2025

Related U.S. Application Data

(63) Continuation of application No. PCT/JP2023/013812, filed on Apr. 3, 2023.

(30) Foreign Application Priority Data

Apr. 4, 2022 (JP) ................................. 2022-062354

(51) Int. Cl.
| | |
|---|---|
| *B62D 6/00* | (2006.01) |
| *B62D 5/00* | (2006.01) |
| *B62D 5/04* | (2006.01) |

(52) U.S. Cl.
CPC ............. *B62D 6/008* (2013.01); *B62D 5/006* (2013.01); *B62D 5/0418* (2013.01); *B62D 5/046* (2013.01)

(58) Field of Classification Search
CPC .......... B62D 6/008; B62D 6/002; B62D 6/00; B62D 5/006; B62D 5/0418; B62D 5/046; B62D 5/001; B62D 5/003; B62D 5/04; B62D 7/17; B62D 9/00
USPC ......................................... 701/41, 42, 43, 44
See application file for complete search history.

(56) References Cited

U.S. PATENT DOCUMENTS

2022/0255473 A1* 8/2022 Tomizawa ............... B62D 5/04

FOREIGN PATENT DOCUMENTS

JP 2018203182 A 12/2018

OTHER PUBLICATIONS

U.S. Appl. No. 18/883,826 and its entire file history.
U.S. Appl. No. 19/001,787 and its entire file history.

* cited by examiner

*Primary Examiner* — Hai H Huynh
(74) *Attorney, Agent, or Firm* — Precision Patents, P.C.

(57) ABSTRACT

A turning control device controls a turning of each wheel in a vehicle in which three or more wheels that are not mechanically restricted from one another can be turned independently. Steering actuator control units are provided corresponding to a plurality of turning actuators that turn the respective wheels, and control a drive current so that a turning angles output by the turning actuators become desired values. A reaction force actuator control unit controls a drive of a reaction force actuator in a steering mechanism of a steer-by-wire system. The turning actuator control units and the reaction force actuator control unit communicate a drive limit information, and limit the drive of the turning actuators and the reaction force actuator based on the drive limit information.

6 Claims, 14 Drawing Sheets

FIRST EMBODIMENT

FIRST EMBODIMENT
CONFIGURATION EXAMPLE (1)

FIRST EMBODIMENT
CONFIGURATION EXAMPLE (2)

RELATIONSHIP BETWEEN CURRENT LIMIT VALUE
AND TURNING ANGLE LIMIT VALUE

RELATIONSHIP BETWEEN TURNING ANGLE LIMIT VALUE
AND STEERING ANGLE LIMIT VALUE

DEFINITION A OF STEERING ANGLE LIMIT VALUE

DEFINITION B OF STEERING ANGLE LIMIT VALUE

DRIVE CURRENT vs. ACTUAL TURNING ANGLE MAP

CURRENT LIMIT VALUE vs. TURNING ANGLE LIMIT VALUE MAP

SECOND EMBODIMENT

ACKERMANN THEORY

MODIFIED EXAMPLE OF SECOND EMBODIMENT

TURNING CONTROL DEVICE

CROSS REFERENCE TO RELATED APPLICATIONS

This application is a continuation application of International Patent Application No. PCT/JP2023/013812 filed on Apr. 3, 2023, which designated the U.S. and based on and claims the benefits of priority of Japanese Patent Application No. 2022-062354 filed on Apr. 4, 2022. The entire disclosure of all of the above applications is incorporated herein by reference.

TECHNICAL FIELD

The present disclosure relates to a turning control device.

BACKGROUND

Conventionally, there is known a technique for switching a target turning angle of the other turned wheels in the case where a malfunction occurs in one of the turned wheels in a steer-by-wire system.

SUMMARY

An object of the present disclosure is to provide a turning control device for an independently turning vehicle having three or more wheels that appropriately ensures vehicle controllability when the drive of any of the turning actuators is restricted.

The turning control device of the present embodiment controls the turning of each wheel in a vehicle in which four wheels that are not mechanically restricted from one another can be turned independently. This turning control device includes a plurality of turning actuator control units and a reaction force actuator control unit.

A turning actuator control unit is provided in correspondence with a plurality of turning actuators for turning each wheel, and controls a drive current applied to the turning actuators so that a turning angle output by the turning actuator becomes desired value. A reaction force actuator control unit controls a drive of a reaction force actuator that applies a reaction force torque against the steering of a driver to a steering wheel in a steering mechanism of a steer-by-wire system that is provided mechanically separated from the turning actuator.

A plurality of turning actuator control units and the reaction force actuator control unit communicate a drive limit information which is information regarding a drive limit of the turning actuator or the reaction force actuator, and limit the drive of the turning actuator and the reaction force actuator based on the drive limit information. For example, as the drive limit information for the reaction force actuator, a steering angle limiting value is communicated from the plurality of turning actuator control units to the reaction force actuator control unit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
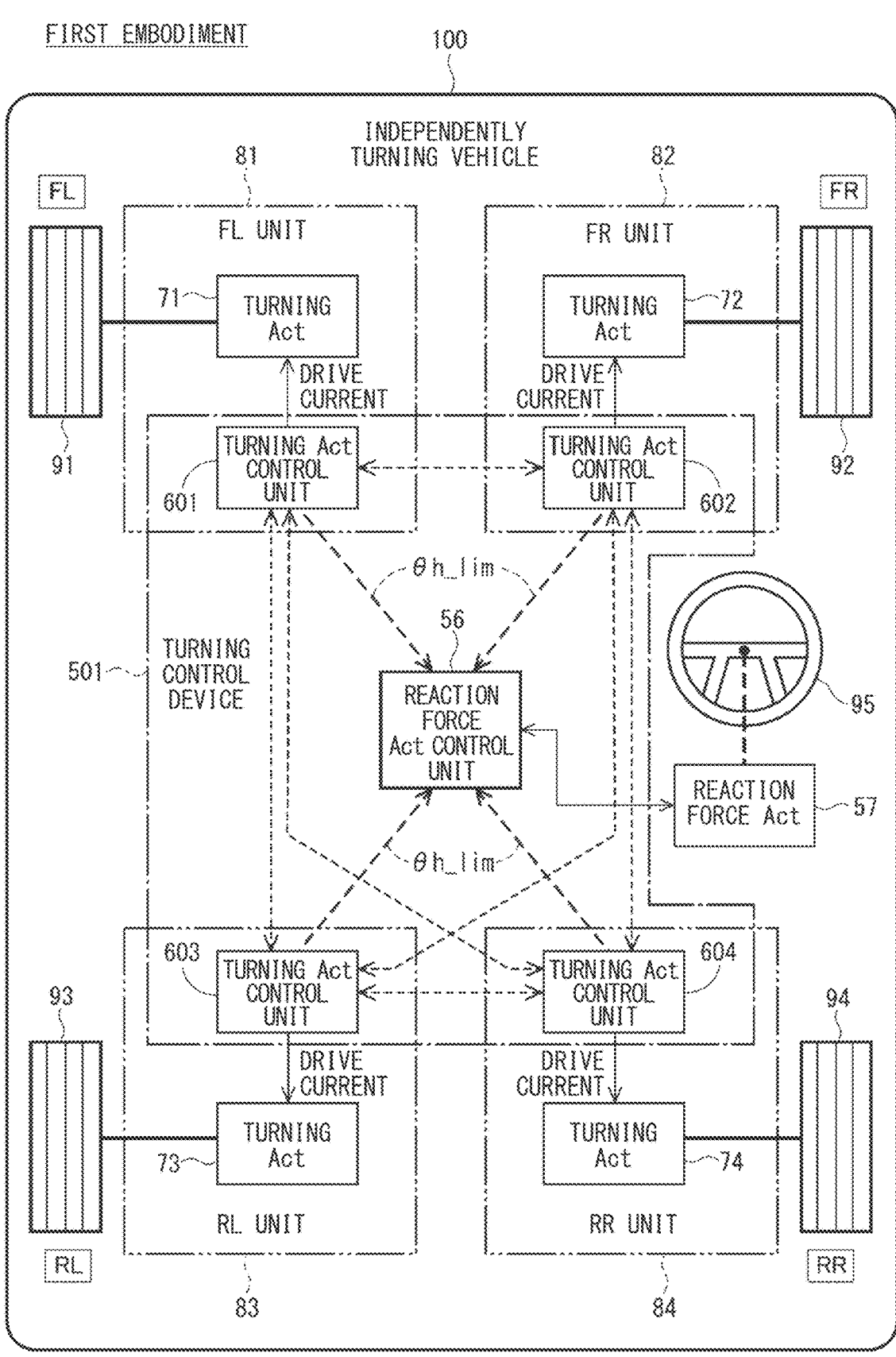
FIG. 1 is a schematic diagram of an independently turning vehicle to which a turning control device according to a first embodiment is applied.

An assumable example switches a target turning angle of the other turned wheels in the case where a malfunction occurs in one of the turned wheels in a steer-by-wire system. In a vehicle turning device, a target turning angle setting means calculates a turning limit turning angle according to the vehicle speed and steering direction when one of the left and right turned wheels fails. When an absolute value of the turning angle of the normally turned wheels is greater than the absolute value of the calculated turning limit turning angle, the target turning angle setting means sets the turning limit turning angle as the target turning angle for the normally steered wheels.

In the example, a "failure of a turned wheel" refers to a case where normal turning angle control for the turned wheel cannot be performed, such as when a turning actuator can no longer generate turning torque. However, a drive current may be limited not only in the case of an abnormality in which the turning angle control function is completely lost, but also for reasons such as overheat protection when an excessive load is applied to any of the turning actuators. When the turning angle of some of the turned wheels is restricted, the vehicle may not move along a target trajectory, which may result in deterioration of vehicle controllability.

The example does not mention anything about measures to be taken when drive is restricted. Furthermore, the example targets vehicles in which only the left and right front wheels are independently turned, and does not take into consideration vehicles with three or more independently turning vehicles, including four-wheel independently turning vehicles.

An object of the present disclosure is to provide a turning control device for an independently turning vehicle having three or more wheels that appropriately ensures vehicle controllability when the drive of any of the turning actuators is restricted.

The turning control device of the present embodiment controls the turning of each wheel in a vehicle in which four wheels that are not mechanically restricted from one another can be turned independently. This turning control device includes a plurality of turning actuator control units and a reaction force actuator control unit.

A turning actuator control unit is provided in correspondence with a plurality of turning actuators for turning each wheel, and controls a drive current applied to the turning actuators so that a turning angle output by the turning actuator becomes desired value. A reaction force actuator control unit controls a drive of a reaction force actuator that applies a reaction force torque against the steering of a driver to a steering wheel in a steering mechanism of a steer-by-wire system that is provided mechanically separated from the turning actuator.

A plurality of turning actuator control units and the reaction force actuator control unit communicate a drive limit information which is information regarding a drive limit of the turning actuator or the reaction force actuator, and limit the drive of the turning actuator and the reaction force actuator based on the drive limit information. For example, as the drive limit information for the reaction force actuator, a steering angle limiting value is communicated from the plurality of turning actuator control units to the reaction force actuator control unit.

In the present disclosure, the plurality of turning actuator control units and the reaction force actuator control unit cooperate with each other to limit the drive of the turning actuator and the reaction force actuator based on the drive limit information. Therefore, when the drive of any one of the turning actuators is limited, vehicle controllability can be appropriately ensured.

Several embodiments of the turning control device will be described with reference to the drawings. In the multiple embodiments, substantially the same components are denoted by the same reference numerals, and a description of the same components will be omitted. In the following description, first and second embodiments are collectively referred to as a present embodiment. The turning control device of the present embodiment controls the turning of each wheel in a vehicle in which four wheels that are not mechanically restricted from one another can be turned independently.

First Embodiment

The configuration of a turning control device 501 of the first embodiment will be described with reference to FIGS. 1 to 6. In the independently turning vehicle 100 shown in FIG. 1, the four wheels 91 to 94 are not mechanically constrained to one another and can be turned independently.

The front left wheel 91 is defined as "FL", the front right wheel 92 is defined as "FR", the rear left wheel 93 is defined as "RL", and the rear right wheel 94 is defined as "RR". For example, each of the wheels 91 to 94 is a drive wheel equipped with an in-wheel motor, and can be independently turned and independently driven.

Four turning actuators ("Turning Act" in the drawing) 71 to 74 turn the wheels 91 to 94. For example, the turning actuators 71 to 74 of the present embodiment are configured with a dual-system three-phase brushless motor having two redundant winding sets. Four turning actuator control units ("Turning Act control unit" in the drawing) 601 to 604 are provided corresponding to the four turning actuators 71 to 74. The turning actuators 71 to 74 and the turning actuator control units 601 to 604 are operated by receiving a power supply voltage from an on-board battery (not shown).

The turning actuator control units 601 to 604 control the drive currents applied to the turning actuators 71 to 74 so that the turning angles output by the turning actuators 71 to 74 become desired values. The turning angle is defined, for example, so that the left side is positive and the right side is negative with respect to the neutral position.

A set of a turning actuator and a turning actuator control unit corresponding to each of the wheels 91 to 94 is referred to as a unit. The turning actuator 71 and the turning actuator control unit 601 constitute an FL unit 81 corresponding to the left front wheel 91. The turning actuator 72 and the turning actuator control unit 602 constitute an FR unit 82 corresponding to the right front wheel 92. The turning actuator 73 and the turning actuator control unit 603 constitute a RL unit 83 corresponding to the left rear wheel 93. The turning actuator 74 and the turning actuator control unit 604 constitute a RR unit 84 corresponding to the right rear wheel 94.

Each unit may be configured as an electromechanically integrated turning module in which the turning actuator and the turning actuator control unit are integrated together. In this case, the turning module may further be configured integrally with the wheels. Alternatively, each unit may have a separate turning actuator and a turning actuator control unit electrically connected by wiring.

Furthermore, the independently turning vehicle 100 employs a steering mechanism of a steer-by-wire system that is provided mechanically separate from the turning actuators 71 to 74. In the steering mechanism of the steer-by-wire system, a reaction force actuator 57 applies a reaction torque to the steering wheel 95 in response to the steering by the driver. For example, the reaction force actuator 57 is configured with a dual-system three-phase brushless motor, similar to the turning actuators 71 to 74. A reaction force actuator control unit 56 controls the driving of the reaction force actuator 57. The turning control device 501 includes four turning actuator control units 601 to 604 and the reaction force actuator control unit 56.

When the drive is not limited, each turning actuator 71 to 74 can independently turn its corresponding wheel 91 to 94 in any direction. In other words, it is possible to generate a turning angle in the range of ±90 degrees with respect to the neutral position. However, when a wheel gets stuck in a rut or hits an obstacle while turning, an excessive load may be applied to one of the turning actuators. As a result, in some units, the drive current may be limited by an overheat protection function that suppresses heat generation in elements and wiring components due to overcurrent. Furthermore, when the power supply voltage drops, or when one of the turning actuators constituted by a dual-system motor is driven, the drive current is also limited. In addition, along with limiting the drive of the turning actuators 71 to 74, it becomes necessary to limit the drive of the reaction force actuator 57 as well.

Such information regarding the drive limit of the turning actuators 71 to 74 or the reaction force actuator 57 is referred to as "drive limit information". In the present embodiment, a plurality of types of drive limit information are used. In FIG. 1, thick dashed arrows represent communication of "drive limit information of the reaction force actuator 57" from the multiple turning actuator control units 601 to 604 to the reaction force actuator control unit 56. The thin dashed double-headed arrows represent communication of "drive limit information of the turning actuators 71 to 74" between a plurality of steering actuator control units 601 to 604.

The plurality of turning actuator control units 601 to 604 and the reaction force actuator control unit 56 communicate one or more types of drive limit information, and limit the drive of the turning actuators 71 to 74 and the reaction force actuator 57 based on the drive limit information. The steering angle limit value θh_lim is communicated from the plurality of turning actuator control units 601 to 604 to the reaction force actuator control unit 56 as drive limit information for the reaction force actuator 57.

The plurality of turning actuator control units 601 to 604 communicate with each other current limit values, turning angle limit values and the like as the drive limit information for the turning actuators 71 to 74. Each of the turning actuator control units 601 to 604 limits the drive of the turning actuators 71 to 74 of its own unit based on the drive limit information of the turning actuators of its own unit and the other units.

Figure 2:
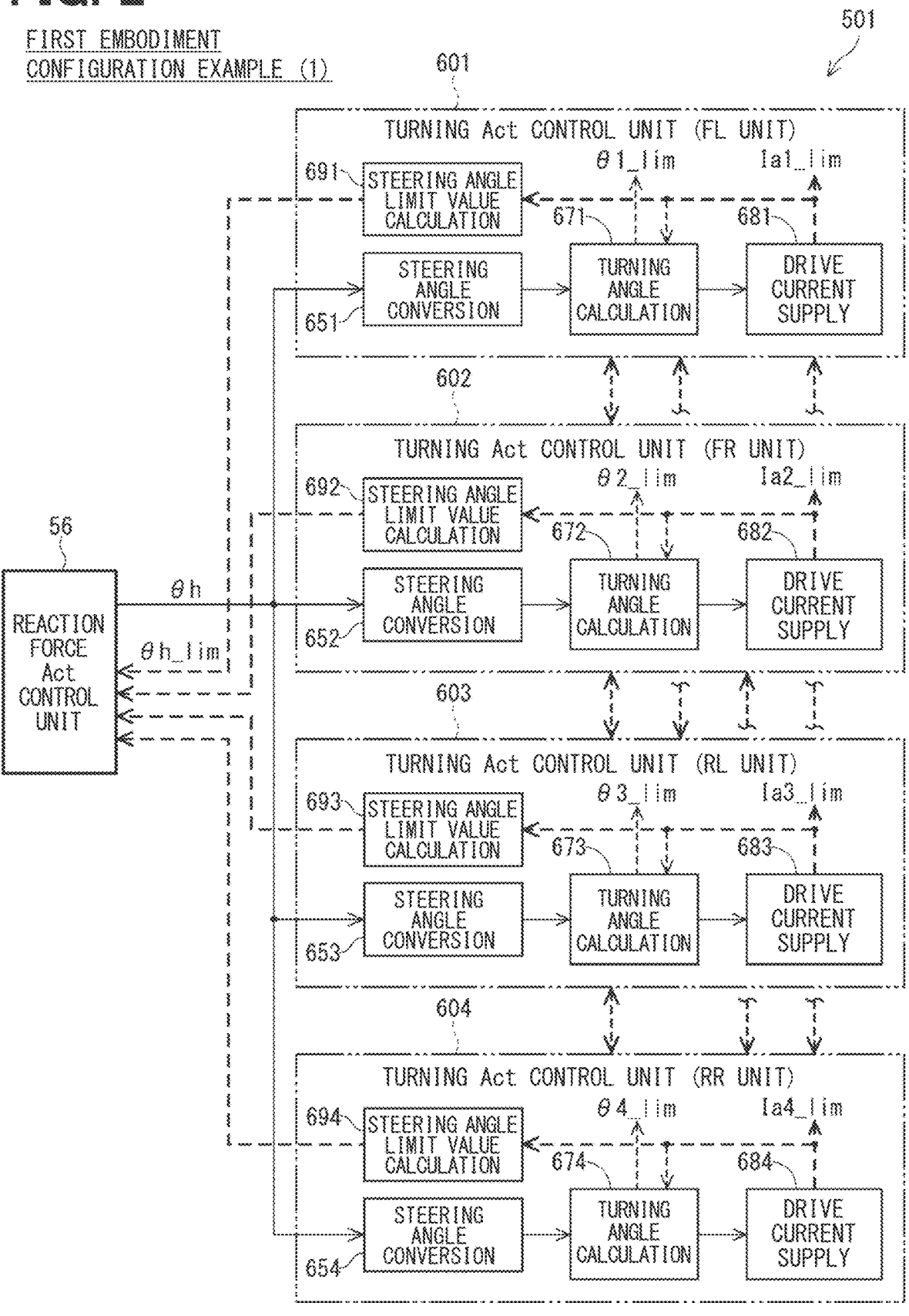
FIG. 2 is a block diagram of a turning control device according to a configuration example (1) of the first embodiment.
Figure 3:
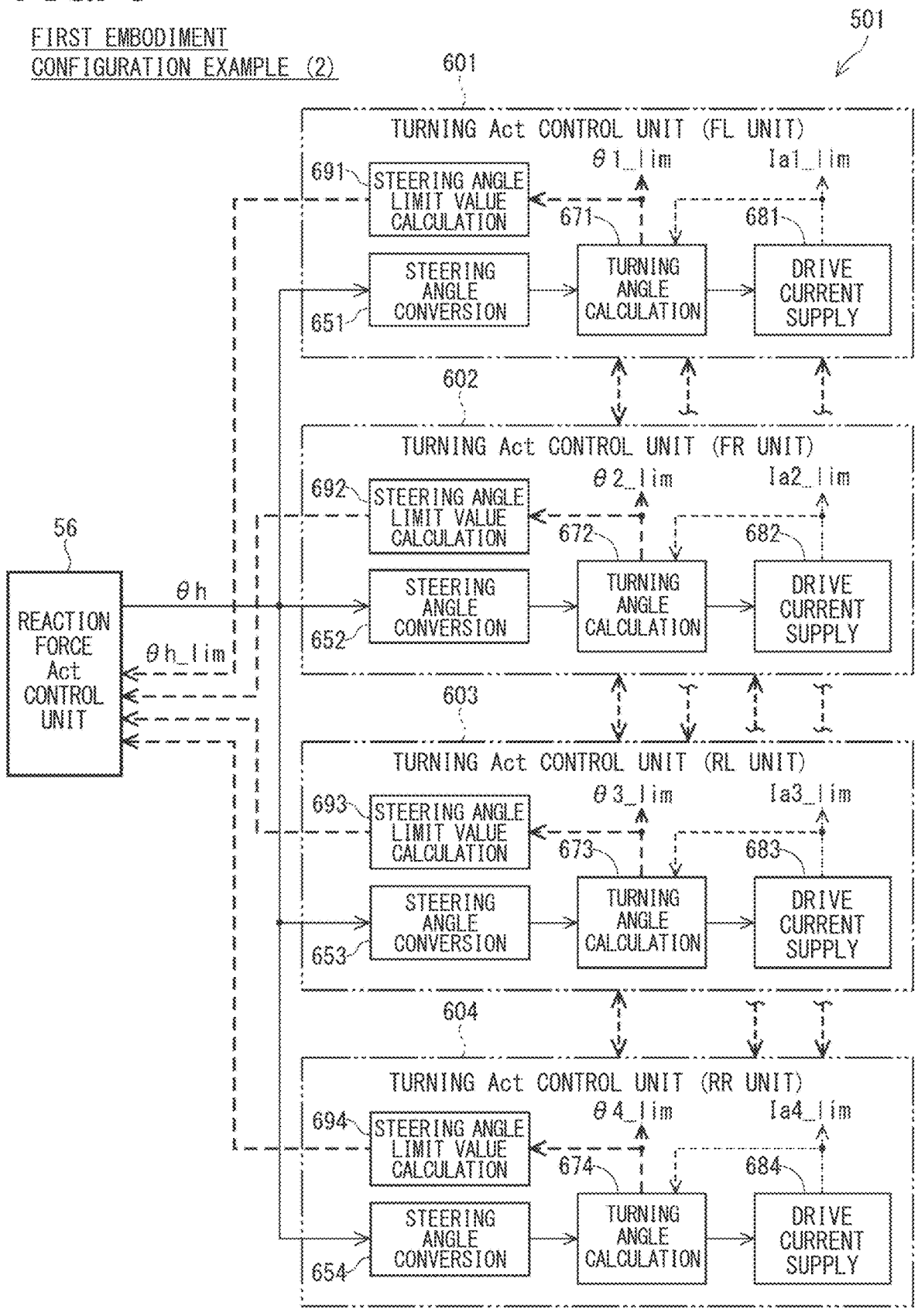
FIG. 3 is a block diagram of a turning control device according to a configuration example (2) of the first embodiment.

FIGS. 2 and 3 show block diagrams of two configuration examples of the turning control device 501. The two configuration examples are the same except that the drive limit information for the turning actuators 71 to 74 communicated between the units is a current limit value or a turning angle limit value. The reaction force actuator control unit 56 outputs a steering angle θh as information reflecting the vehicle operation to be realized. Like the turning angles of the wheels 91 to 94, the steering angle θh of the steering wheel 95 is defined such that, for example, the left side is positive and the right side is negative with respect to the neutral position. The steering angle is calculated by multiplying the rotation angle of the reaction force actuator 57 by a conversion constant such as a gear ratio.

The turning actuator control units 601 to 604 of the respective units include the steering angle conversion sections 651 to 654, the turning angle calculation sections 671 to 674, the drive current supply sections 681 to 684 and the steering angle limit value calculation sections 691 to 694.

The steering angle conversion sections 651 to 654 convert the steering angle θh obtained from the reaction force actuator control unit 56 into information that can be processed by the turning angle calculation sections 671 to 674. In the second embodiment, the turning center setting sections 661 to 664 in which the steering angle conversion sections 651 to 654 are embodied are provided, and the steering angle θh is converted into information indicating a turning center and input to turning angle calculation sections 671 to 674. In contrast, the steering angle conversion sections 651 to 654 in the first embodiment are blocks that convert the steering angle θh into some information other than the turning center.

The turning angle calculation sections 671 to 674 calculate the turning angle command values for the wheels 91 to 94 based on information converted from the steering angle θh by the steering angle conversion sections 651 to 654. For example, when conversion information of the steering angle θh instructing a left turn is received, the turning angle calculation section 671 of the FL unit 81 and the turning angle calculation section 672 of the FR unit 82 calculate a positive turning angle. When conversion information of the steering angle θh instructing a right turn is received, the turning angle calculation section 671 of the FL unit 81 and the turning angle calculation section 672 of the FR unit 82 calculate a negative turning angle.

In the case of a turning operation in which the front wheels are turned according to parallel geometry, the turning angles of the left and right front wheels 91, 92 are set to be equal. In other words, a steering angle ratio of the turning angle of the wheels on the outside of the turn to the turning angle of the wheels on the inside of the turn is 1. In the following text, the term "steering angle ratio" is used in the above sense. In the case of a turning operation in which the front wheels are turned according to the Ackermann geometry, the absolute value of the turning angle of the wheels on the inside of the turn is set to be larger than the absolute value of the turning angle of the wheels on the outside of the turn. In other words, the steering angle ratio in the turning operation according to the Ackermann theory is a value smaller than 1. The Ackermann theory will be described later in the second embodiment with reference to FIG. 12. In a turning operation intermediate between the parallel geometry and the Ackermann geometry, the steering angle ratio is a value larger than the Ackermann steering angle ratio and smaller than 1.

The drive current supply sections 681 to 684 calculate and supply drive currents to be energized to the turning actuators 71 to 74 in accordance with the turning angle command values calculated by the turning angle calculation sections 671 to 674. For example, an inverter that converts DC power from a battery into three-phase AC power is included in the drive current supply section. Furthermore, the drive current supply sections 681 to 684 have a function of limiting the drive current that they calculate based on overheat protection information, power supply voltage drop information, one-system drive information, and the like.

The current limit values of the drive currents in the drive current supplying sections 681 to 684 of each unit are denoted as Ia1_lim-Ia4_lim. The current limit value may be defined as any of the dq axis current, the phase current, the effective value, etc. Further, the turning angle limit value corresponding to the current limit value Ia1_lim-Ia4_lim is denoted as θ1_lim-θ4_lim. The turning angle limit value is expressed as a positive value as a limit value for the absolute value of the turning angle, regardless of whether the turning angle is positive or negative, i.e., regardless of whether the turning angle is left or right.

Figure 4:
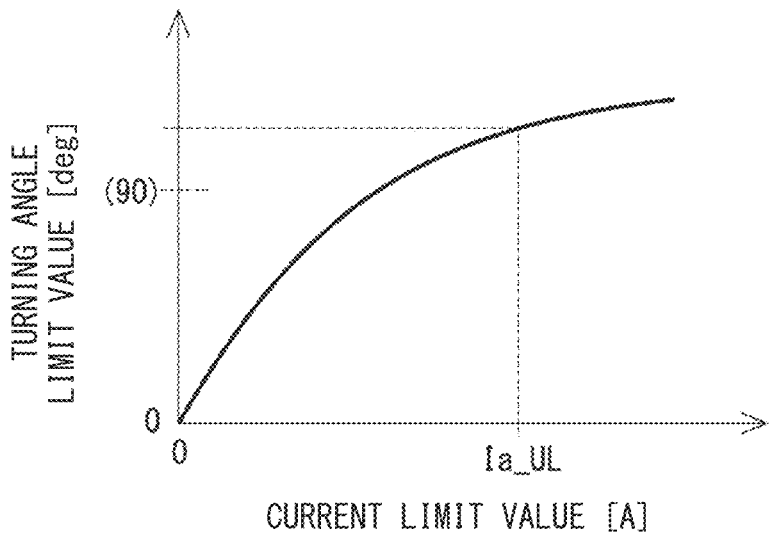
FIG. 4 is a diagram showing a relationship between a current limit value and a turning angle limit value.

As shown in FIG. 4, there is a positive correlation between the current limit value and the turning angle limit value. The current limit value equivalent to the turning angle limit value of 90 degrees plus a margin becomes the substantial limit upper limit value Ia_UL. When the current limit value is not limited, for example, the current limit value may be set to a value larger than the limit upper limit value Ia_UL. Alternatively, the presence or absence of a current limit may be determined by a flag.

The turning angle calculation sections 671 to 674 of each unit calculate a turning angle command value so that the absolute value of the turning angle command value according to the turning direction is equal to or less than the turning angle limit value θ1_lim-θ4_lim. For example, when the turning angle limit value is 15 degrees, the turning angle calculation sections 671 to 674 calculate the turning angle command value in the range of 0 to +15 degrees for a left turn and in the range of −15 to 0 degrees for a right turn.

As in FIG. 1, the dashed double-headed arrows between each unit in FIG. 2 and FIG. 3 indicate the communication of drive limit information for the turning actuators 71 to 74. In the first embodiment, the current limit value Ia1_lim-Ia4_lim of the drive current of each of the turning actuators 71 to 74 or the turning angle limit value θ1_lim-θ4_lim is communicated between the units as drive limit information. For convenience of illustration, the broken lines indicating communication between units that are not adjacent on the paper are shown with the portions that cross other units omitted.

When the drive limit information of turning actuators 71 to 74 is the current limit value Ia1_lim-Ia4_lim of the drive current, the turning actuator control units 601-604 of each unit limit the drive current of its own unit to less than the minimum of the current limit values of all the units. The turning angle limit of each unit when the drive limit information of turning actuators 71 to 74 is the turning angle limit value θ1_lim-θ4_lim will be described later.

The steering angle limit value calculation sections 691 to 694 calculate the steering angle limit value θh_lim based on the current limit value Ia1_lim-Ia4_lim of the drive current of each of turning actuators 71 to 74 or the steering angle limit value θ1_lim-θ4_lim. The steering angle limit value is expressed as a positive value as a limit value for the absolute value of the steering angle, regardless of whether the steering angle is positive or negative, i.e., regardless of the rotation direction of the steering wheel 95 from the neutral position. The steering angle limit value θh_lim calculated by the steering angle limit value calculation sections 691 to 694 of the respective units is communicated to the reaction force actuator control unit 56 as drive limit information for the reaction force actuator 57.

Figure 5:
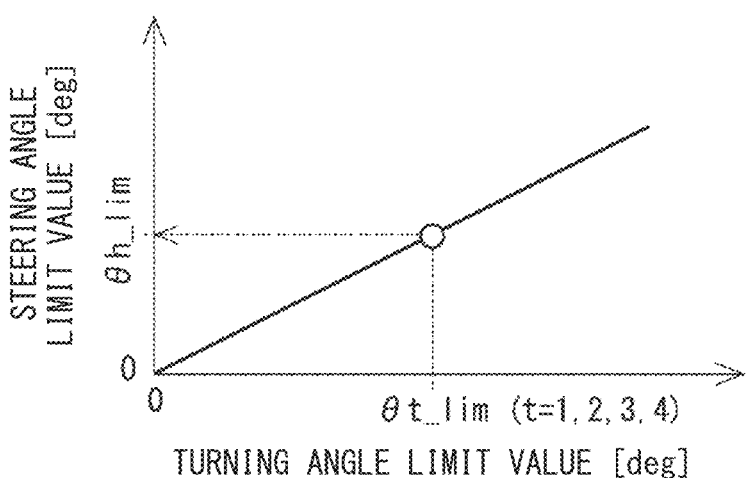
FIG. 5 is a diagram showing a relationship between a turning angle limit value and a turning angle limit value.

Specifically, in the configuration example (1) shown in FIG. 2, the steering angle limit value θh_lim is calculated based on the minimum value of the current limit values Ia1_lim-Ia4_lim obtained by mutual communication between the units. As shown in FIG. 4 and FIG. 5, there is a positive correlation between the current limit value Ia1_lim-Ia4_lim and the steering angle limit value θh_lim.

In the configuration example (2) shown in FIG. 3, the turning angle limit value θh_lim is calculated based on the minimum value of the turning angle limit values θ1_lim-θ4_lim obtained by mutual communication between each unit, or based on the corrected turning angle limit value. As will be described later with reference to FIGS. 8, 9A, and 9B, the corrected turning angle limit value is a value obtained by executing a correction calculation defined for each unit on the minimum value of the turning angle limit value.

As shown in FIG. 5, there is a positive correlation between the turning angle limit value θt_lim (t=1, 2, 3, 4) and the turning angle limit value θh_lim. Incidentally, since the turning angle limit values θ1_lim-θ4_lim of the turning actuators 71 to 74 may differ from one another, the turning angle limit value of any one of the steering actuators is represented as "θt_lim."

Figure 6A:
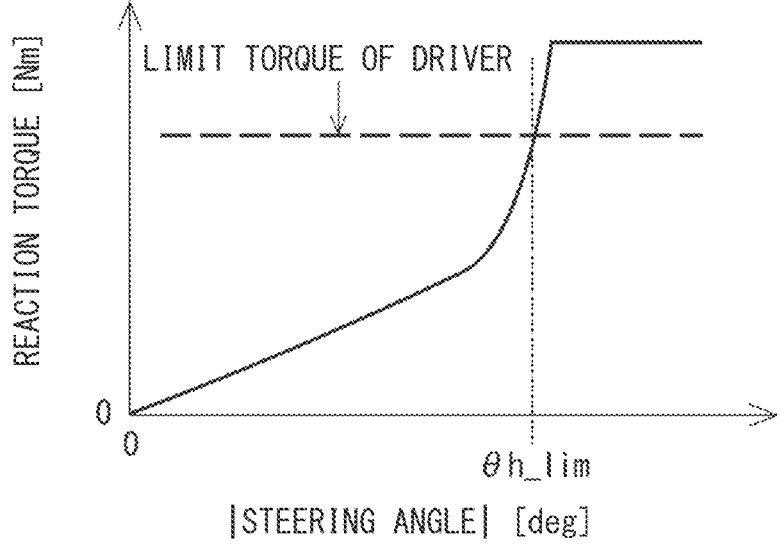
FIG. 6A is a diagram illustrating a definition A of a steering angle limit value.

Two definitions of the "steering angle limit value" will be described with reference to FIG. 6A and FIG. 6B. In the definition A shown in FIG. 6A, the reaction torque output by the reaction force actuator 57 is set to increase as the absolute value of the steering angle increases, and to increase rapidly when the absolute value of the steering angle approaches the steering angle limit value θh_lim. When the absolute value of the steering angle reaches the steering angle limit value θh_lim, the reaction torque exceeds the limit torque due to the arm strength of a general driver, and the driver becomes unable to steer any further. In other words, the "limit angle at which the steering wheel can be steered by the torque of the driver" is defined as the steering angle limit value.

Figure 6B:
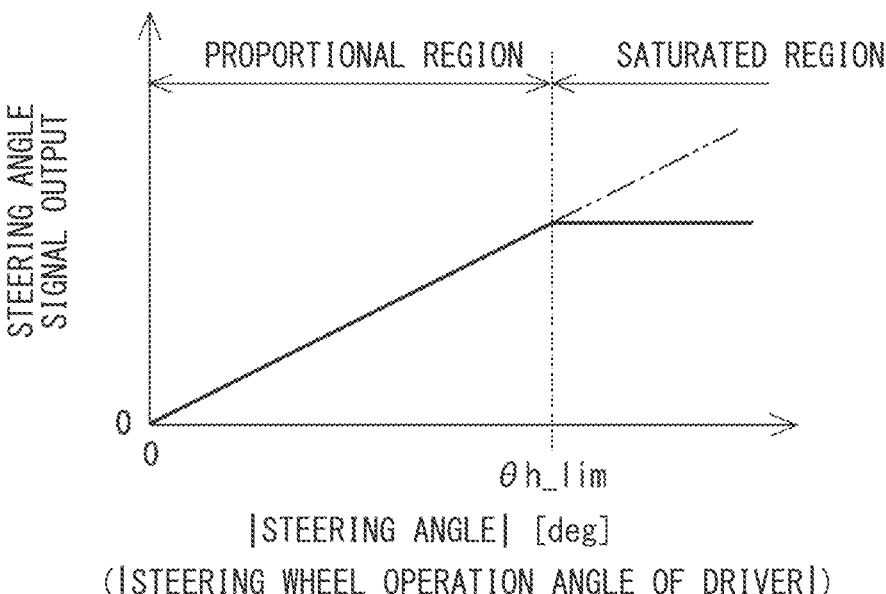
FIG. 6B is a diagram illustrating a definition B of a steering angle limit value.

In the definition B shown in FIG. 6B, the "steering angle" on the horizontal axis is used to mean "the angle at which the driver operates the steering wheel" rather than the angle at which the wheels are ultimately turned. In a proportional region equal to or less than the steering angle limit value θh_lim, a steering angle signal proportional to the steering wheel operation angle of the driver is output. However, in the saturated region exceeding the steering angle limit value θh_lim, the steering angle signal remains constant and does not change even if the driver operates the steering wheel, making it impossible to turn the wheels as intended. That is, the "limit angle at which a steering angle signal proportional to the steering wheel operation angle of the driver is output" is defined as the steering angle limit value.

In practice, it is preferable to adopt the definition A since it does not give the driver a sense of incongruity. However, in order to solve the problem of the present embodiment, namely, "ensuring appropriate vehicle controllability when limiting the drive of the turning actuator," the steering angle limit according to the definition B may be executed.

Figure 7:
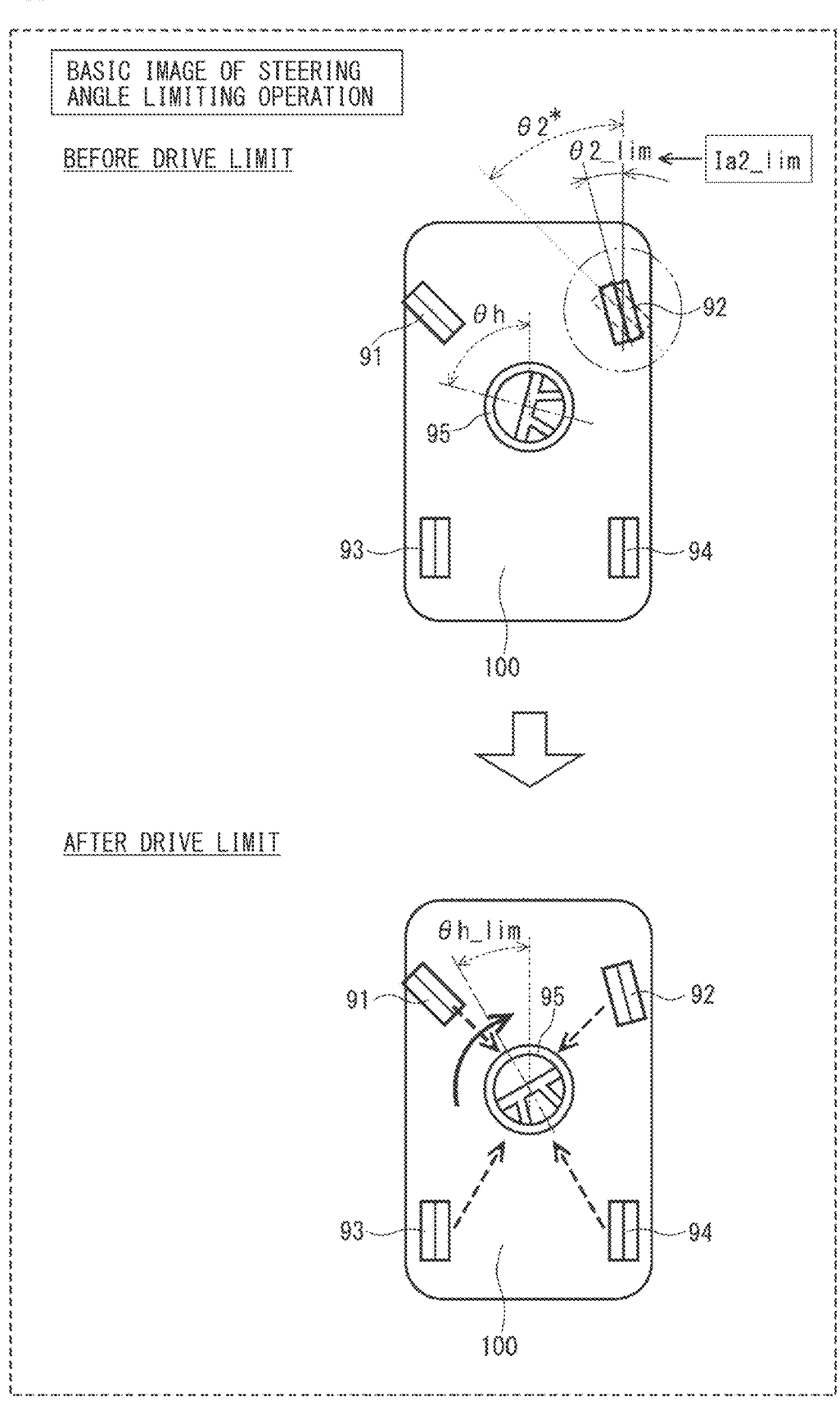
FIG. 7 is a diagram showing a basic image of steering angle limiting operation by communication of drive limit information.

Next, a basic image of the steering angle limiting operation based on communication of drive limit information of the reaction force actuator 57 will be described with reference to FIG. 7. In FIG. 7, communication of drive limit information for the turning actuators 71 to 74 between the units is omitted. Assume a situation in which the drive current in the FR unit corresponding to the right front wheel 92 is limited to the current limit value Ia2_lim. The absolute value of the turning angle command value of the FR unit is limited to the turning angle limit value θ2_lim.

Before drive limit, a turning angle command value θ2* for the right front wheel 92 is calculated based on a steering angle θh corresponding to a vehicle operation to be realized. The imaginary state in which the right front wheel 92 is turned according to the turning angle command value θ2* is shown by the dashed line. However, based on the turning angle limit value θ2_lim of the FR unit, the state indicated by the solid line becomes the limit turning angle of the right front wheel 92. When the vehicle 100 were to turn in this state, the vehicle 100 would be out of control.

In order to avoid this situation, the steering angle limit value θh_lim is communicated as drive limit information for the reaction force actuator 57 from a plurality of turning actuator control units 601 to 604 to the reaction force actuator control unit 56. In this example, the current limit value Ia2_lim and the turning angle limit value θ2_lim of the FR unit are the minimum values of the current limit values and the turning angle limit values of all the units. The steering angle limit value calculation sections 691 to 694 calculate the steering angle limit value θh_lim based on the minimum current limit value, the minimum turning angle limit value or the corrected turning angle limit value, and communicate this value to the reaction force actuator control unit 56. The reaction force actuator control unit 56 limits the driving of the reaction force actuator 57 so that the absolute value of the steering angle θh is equal to or smaller than the steering angle limit value θh_lim.

Figure 8:
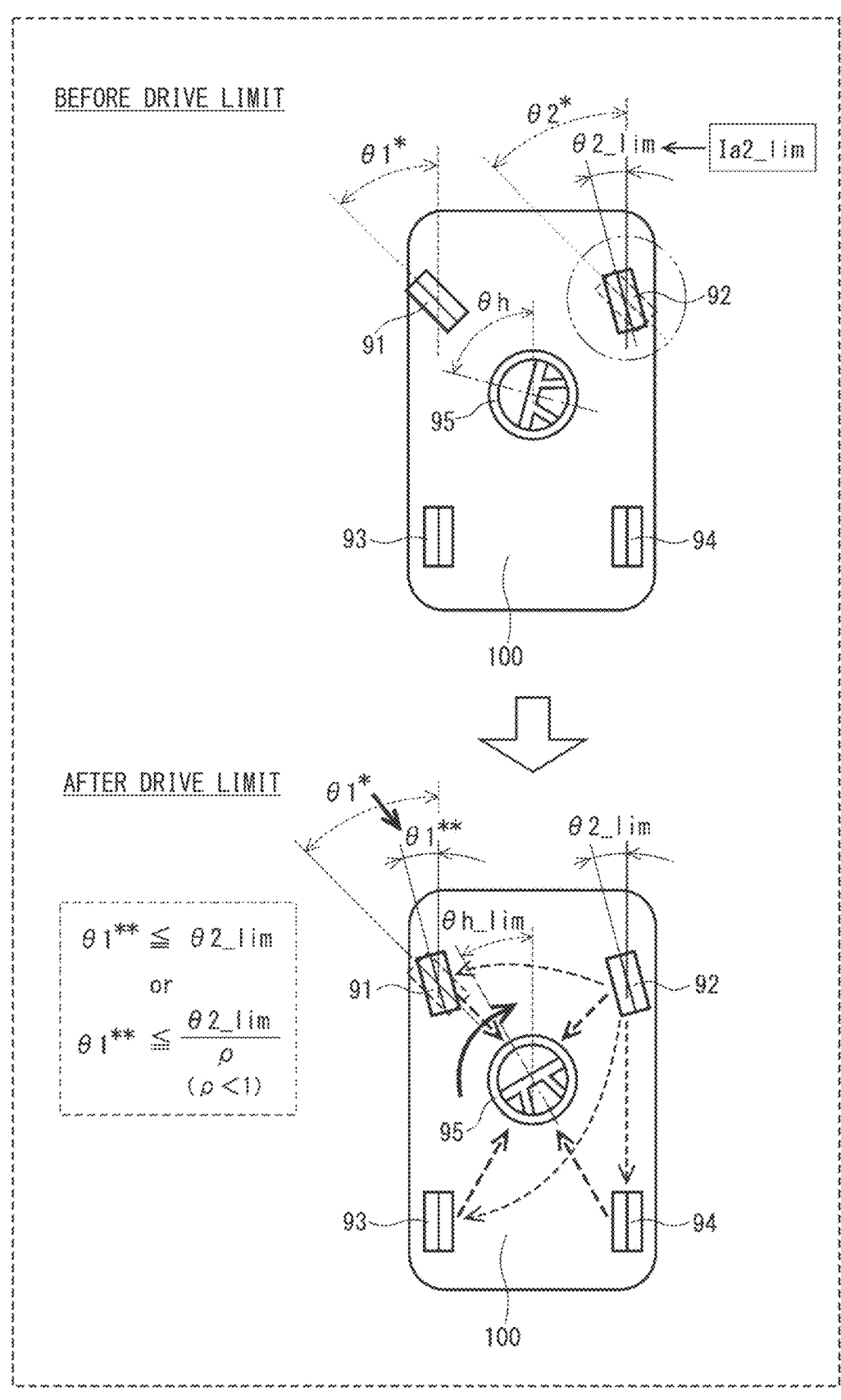
FIG. 8 is a diagram showing an example of a limiting operation of a turning angle and a steering angle by communication of drive limit information.

Next, with reference to FIGS. 8, 9A and 9B, an example of the limiting operation of the turning angle and the steering angle by communication of drive limit information including the communication between units in the first embodiment will be described. As shown in FIG. 8, the drive current in the FR unit corresponding to the right front wheel 92 is limited to a current limit value Ia2_lim. The absolute value of the turning angle command value of the FR unit is limited to the turning angle limit value θ2_lim. For ease of expla- nation, it is assumed that the rear wheels 93, 94 remain in a neutral position and are not turned, and only the front wheels 91, 92 are turned to turn left.

Before drive limit, the turning angle command value θ1* for the left front wheel 91 and the turning angle command value θ2* for the right front wheel 92 are calculated based on the steering angle θh corresponding to a vehicle operation to be realized. The imaginary state in which the right front wheel 92 is steered according to the command value θ2* is shown by the dashed line. However, based on the turning angle limit value θ2_lim of the FR unit, the state indicated by the solid line becomes the limit turning angle of the right front wheel 92. When the vehicle 100 were to turn in this state, that is, with the left front wheel 91 not being restricted from turning and only the right front wheel 92 being restricted from turning, the vehicle 100 would be in an uncontrollable state.

In order to avoid this situation, the current limit value Ia2_lim or the turning angle limit value θ2_lim is commu- nicated as drive limit information for the turning actuators 71 to 74 from the turning actuator control unit of the FR unit to the turning actuator control unit of the other unit. When the drive limit information of the turning actuators 71 to 74 is the current limit value Ia2_lim of the drive current, the turning actuator control unit of the FL unit limits the drive current of its own unit to less than or equal to the current limit value Ia2_lim of the FR unit, which is the minimum current limit value of all units.

When the drive limit information of turning actuators 71 to 74 is the turning angle limit value θ2_lim, the turning actuator control unit of the FL unit limits the absolute value of the turning angle command value of its own unit to less than or equal to the turning angle limit value θ2_lim of the FR unit, which is the minimum value of the turning angle limit values of all units. When the absolute values of the turning angle command values of the left and right units are both set equal to the minimum value of the turning angle limit values, a turning operation according to the parallel geometry is realized.

Alternatively, a correction calculation for the turning angle is generally specified between each unit, and a cor- rected turning angle limit value may be calculated by performing the correction calculation for the minimum value of the turning angle limit values of all the units. For example, it is assumed that a correction turning angle ratio ρ (<1) corresponding to the vehicle speed etc. is defined between the left and right units on the inside and outside of a turn, and a calculation of multiplication and division of the correction turning angle ratio ρ is performed.

Figure 9A:
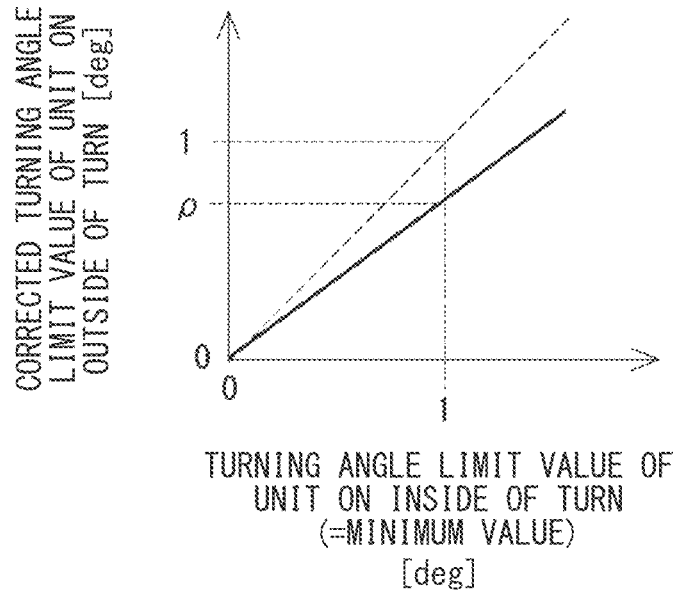
FIG. 9A is a diagram showing a corrected turning angle limit value of an unit on an outside of a turn when the drive of an unit on an inside of the turn is limited.
Figure 9B:
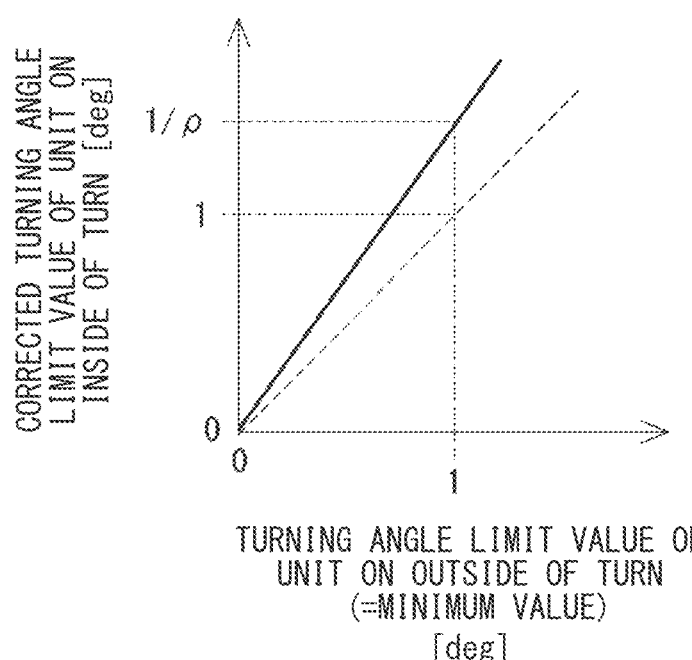
FIG. 9B is a diagram showing a corrected turning angle limit value of the unit on the inside of the turn when the drive of the unit on the outside of the turn is limited.

FIG. 9A shows the relationship between the turning angle limit values of the left and right units when the drive of the unit on the inside of the turn is limited. When the turning angle limit value of the unit on the inside of the turn is the minimum value, if the turning angle limit value of the unit on the inside of the turn is 1, the corrected turning angle limit value of the unit on the outside of the turn is ρ, that is, a value smaller than 1. FIG. 9B shows the relationship between the turning angle limit values of the left and right units when the drive of the unit on the outside of the turn is limited. When the turning angle limit value of the unit on the outside of the turn is the minimum value, if the turning angle limit value of the unit on the outside of the turn is 1, the corrected turning angle limit value of the unit on the inside of the turn is (1/ρ), that is, a value greater than 1. According to this configuration, the degree of freedom is improved to realize a turning operation according to the Ackermann geometry or a turning operation intermediate between the parallel geometry and the Ackermann geometry.

In the operation example shown in FIG. 8, the turning angle limit value θ2_lim of the FR unit on the outside of the turn is the minimum value. Therefore, the turning actuator control unit of the FL unit limits the absolute value of the turning angle command value of its own unit to less than or equal to θ2_lim, or to less than or equal to the corrected turning angle limit value (θ2_lim/ρ) obtained by performing a correction calculation using the correction turning angle ratio ρ. The turning angle command value of the FL unit after the drive limit is denoted as θ1**.

As a result, the turning angle of the left front wheel 91 is limited to be equal to or less than the turning angle of the right front wheel 92. Incidentally, since the turning angle command values of the RL unit and the RR unit correspond- ing to the left and right rear wheels 93, 94 are originally 0 deg, there is no influence of the drive limit. In addition, the absolute value of the steering angle θh is limited to be equal to or less than the steering angle limit value θh_lim calcu- lated based on the current limit value Ia2_lim or the turning angle limit value θ2_lim.

In the present embodiment, when the drive current of the turning actuator in some units is limited, the multiple turning actuator control units 601 to 604 and the reaction force actuator control unit 56 cooperate to limit the turning angle command values of each turning actuator 71 to 74 and to limit the steering angle θh. Therefore, vehicle controllability is ensured, and the vehicle 100 can achieve stable turning operations.

Here, when the characteristics of the current limit value and the turning angle limit value in each unit are the same, there is no substantial difference no matter which one is communicated as the drive limit information for the turning actuators 71 to 74. However, in cases where there are differences in the characteristics of the current limit value and the turning angle limit value for each unit, communi- cating the turning angle limit value as drive limit informa- tion for the turning actuators 71 to 74 makes it possible to directly limit the turning angle of each unit in a balanced manner.

Incidentally, the characteristics of the actual turning angle with respect to the drive current differ depending on the road surface conditions such as the road surface friction coeffi- cient and unevenness, and the characteristics of the turning angle limit value with respect to the current limit value also change. Next, calculation of the turning angle limit value that reflects the road surface conditions will be described with reference to FIGS. 10A and 10B.

Figure 10A:
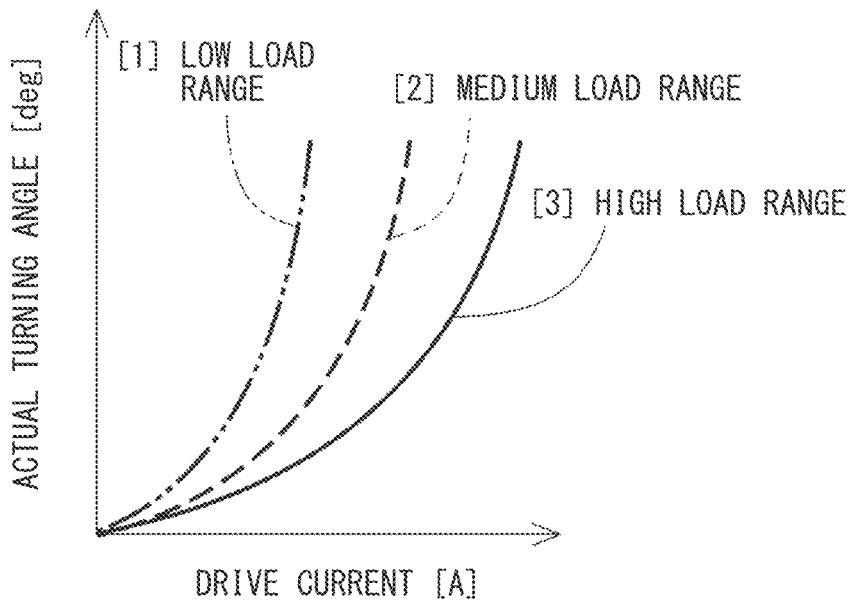
FIG. 10A is an example showing a drive current vs. an actual turning angle map.
Figure 10B:
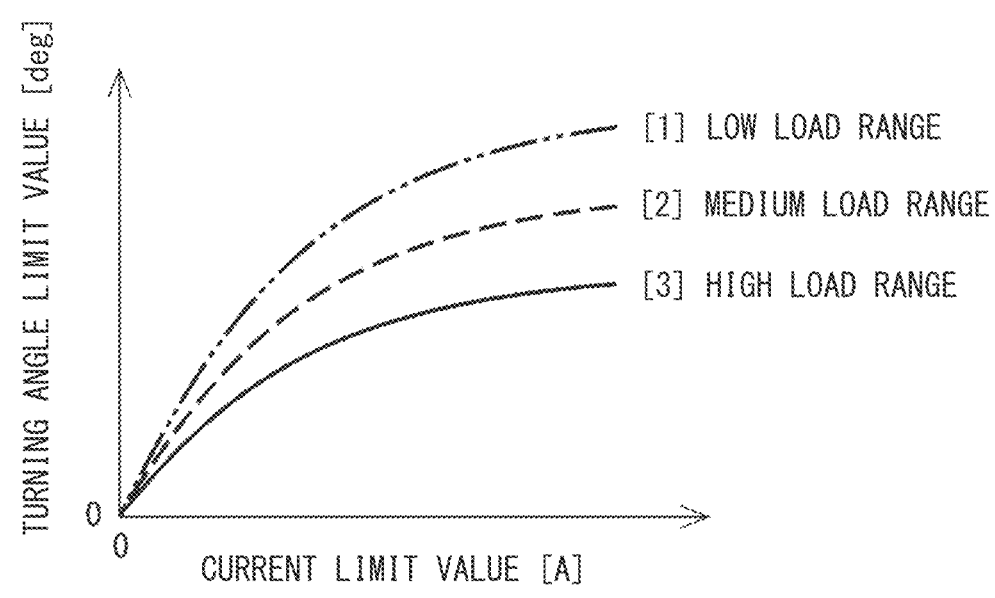
FIG. 10B is an example showing a current limit value vs. a turning angle limit value map.

Each of the turning actuator control units 601 to 604 stores the drive current vs. actual turning angle map shown in FIG. 10A and the current limit value vs. turning angle limit value map shown in FIG. 10B. Here, the term "map" is not limited to a large number of data groups stored in a readable manner, but also includes calculation formulas. In other words, outputting the calculation result of a formula based on input variables is also considered to be one form of calculation using a map.

The drive current vs. actual turning angle map defines the actual turning angle of the wheels 91 to 94 relative to the drive current of the turning actuators 71 to 74 for one or more load ranges divided according to the magnitude of the load. Relatively, the load range is divided into [1] a low load range, [2] a medium load range, and [3] a high load range. In the low load range, a large actual turning angle is generated with a relatively small drive current, whereas in the high load range, a larger drive current is required to generate the same degree of actual turning angle.

The current limit value vs. turning angle limit value map defines the relationship between the current limit value of the drive current for the turning actuators 71 to 74 and the turning angle limit value for each load range. In a case where the current limit values are same, the turning angle limit value in the low load range is greater than the turning angle limit value in the high load range.

Each turning actuator control unit 601 to 604 may calculate the actual turning angle based on the rotation angle detection values of the turning actuators 71 to 74, for example, or may obtain the actual turning angle from a turning angle sensor provided on the wheels 91 to 94. The turning actuator control units 601 to 604 determine a load range based on the drive current flowing through the turning actuators 71 to 74 and the detected actual turning angle, using a drive current vs. actual turning angle map.

Then, the turning actuator control units 601 to 604 calculate the turning angle limit value corresponding to the current limit value in the determined load range, using a current limit value vs. turning angle limit value map. According to this configuration, it is possible to appropriately set the turning angle limit values for each of the wheels 91 to 94 according to the road surface conditions.

Second Embodiment

Figure 11:
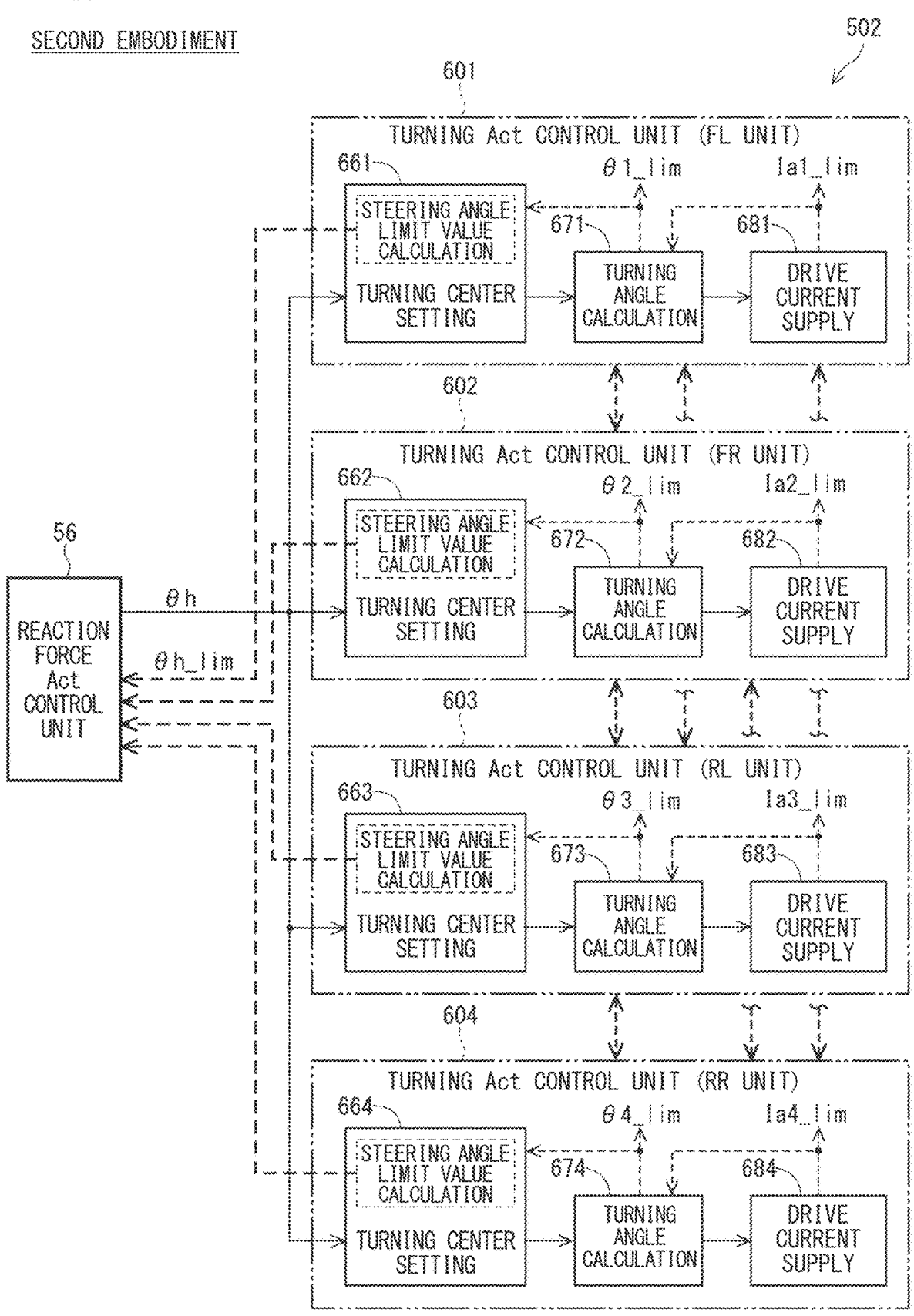
FIG. 11 is a block diagram of a turning control device according to a second embodiment.

The second embodiment will be described with reference to FIGS. 11 to 15. As shown in FIG. 11, in a turning control device 502 of the second embodiment, turning center setting sections 661 to 664 are provided in place of the steering angle conversion sections 651 to 654 in the first embodiment. The turning center setting sections 661 to 664 set a turning center based on the steering angle θh that reflects the vehicle operation that the driver desires to achieve. After the turning center is set from the steering angle θh, the turning angle command value for each unit is calculated.

In the configuration example shown in FIG. 11, the turning center setting sections 661 to 664 are provided inside the turning actuator control units 601 to 604 of the respective units. The turning angle calculation sections 671 to 674 calculate the turning angle command values based on the turning centers set by the turning center setting sections 661 to 664. Furthermore, the turning angle calculation sections 671 to 674 notify the turning center setting sections 661 to 664 of the turning angle limit values θ1_lim-θ4_lim.

Furthermore, the turning center setting sections 661 to 664 determine a turning center setting range based on the turning angle limit value θ1_lim-θ4_lim, as will be described later with reference to FIG. 13. The turning center setting range corresponds to the turning angle range of each wheel that is permitted according to the turning angle limit value θ1_lim-θ4_lim. Furthermore, the turning center setting sections 661 to 664 each have the function of a steering angle limit value calculation unit built therein, and the turning angle limit value θh_lim is calculated based on the turning center setting range. The steering angle limit value θh_lim is communicated from a plurality of turning actuator control units 601 to 604 to the reaction force actuator control unit 56 as drive limit information for the reaction force actuator 57.

Figure 12:
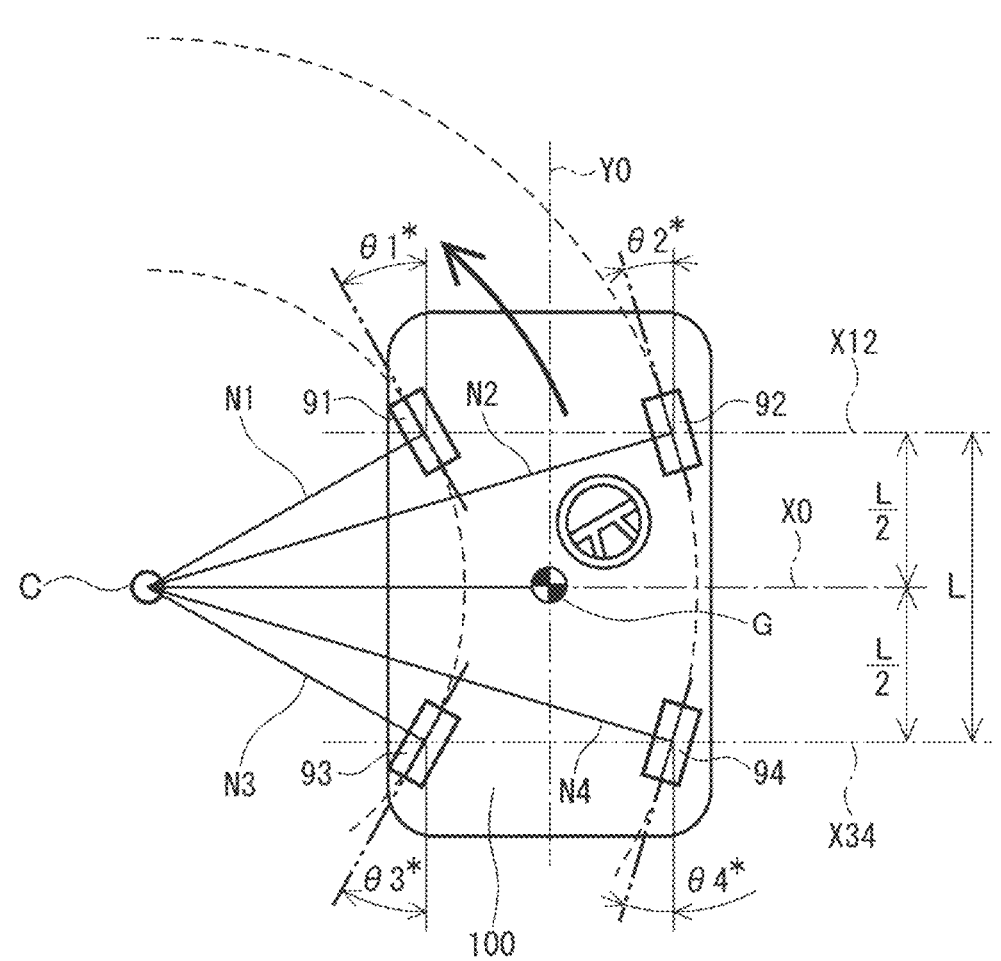
FIG. 12 is a diagram illustrating an Ackermann theory.

The calculation of the turning angle command values θ1* to θ4* based on the Ackermann theory will be described with reference to FIG. 12. According to the Ackermann theory, the turning direction of each of the wheels 91 to 94 is perpendicular to the straight lines N1 to N4 connecting the turning center C and the center of each of the wheels 91 to 94. That is, each of the wheels 91 to 94 is steered in the tangent direction of a circle having the turning center C as its center.

Here, an axis passing through the centers of the front wheels 91, 92 and perpendicular to a vehicle longitudinal axis Y0 is defined as a front wheel axis X12, and an axis passing through the centers of the rear wheels 93, 94 and perpendicular to the vehicle longitudinal axis Y0 is defined as a rear wheel axis X34. The distance between the front wheel axis X12 and the rear wheel axis X34 is a wheelbase L. Further, an axis passing through the center of gravity G and perpendicular to the vehicle longitudinal axis Y0 is represented as a center of gravity axis X0. Assuming that the weight distribution in the longitudinal direction of the vehicle is uniform, the center of gravity axis X0 is located midway between the front wheel axis X12 and the rear wheel axis X34. When the turning center C is set on the center of gravity axis X0, the left front wheel 91 and the left rear wheel 93, and the right front wheel 92 and the right rear wheel 94 each turn on the same arc, so that the inner wheel difference and the outer wheel difference become zero and the running resistance during turning becomes small.

Figure 13:
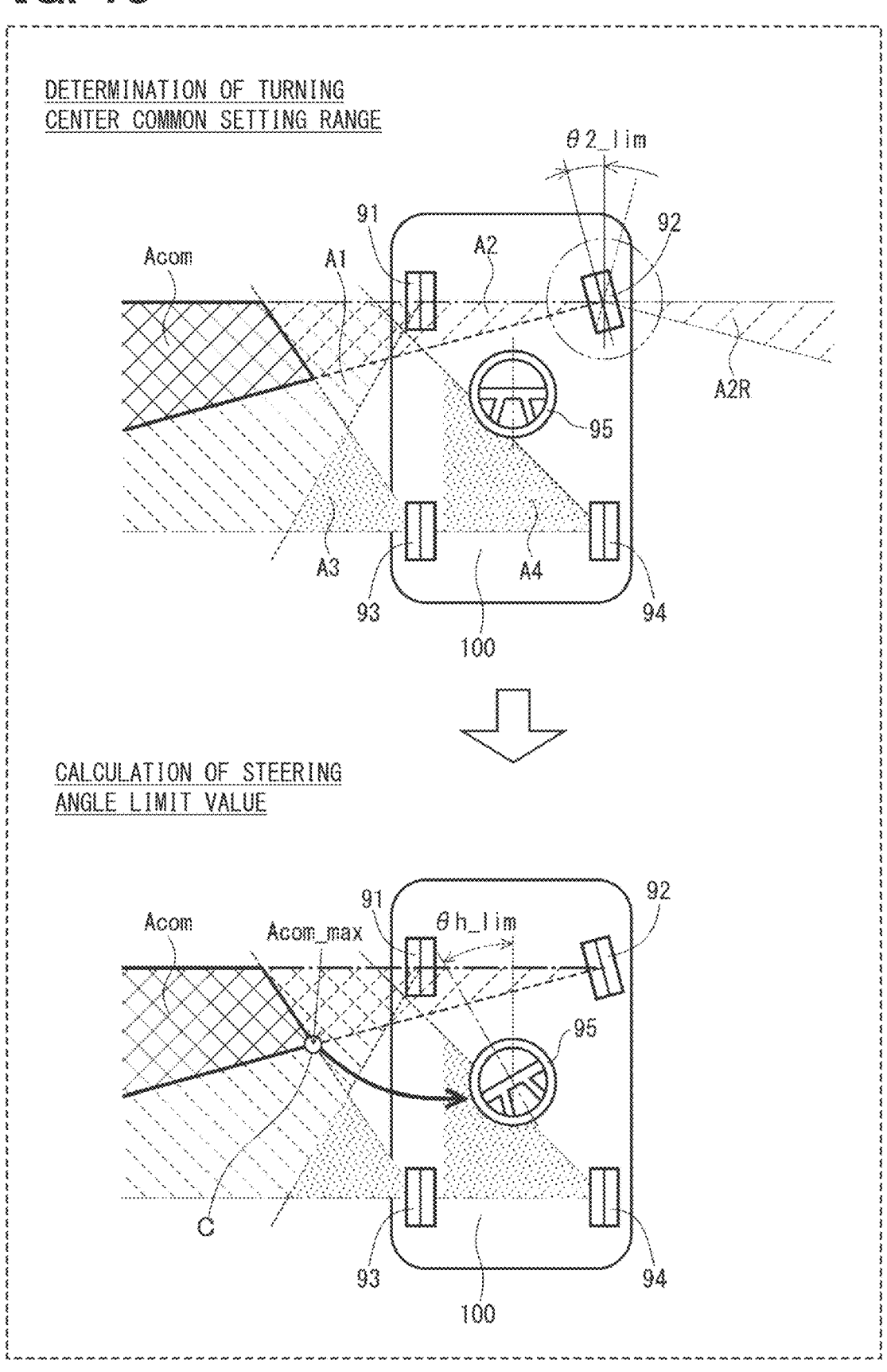
FIG. 13 is a diagram for explaining a determination of a common turning center common setting range and calculation of a steering angle limit value.

With reference to FIG. 13, the determination of the turning center setting range and the calculation of the steering angle limit value θh_lim based on the turning center setting range will be described. The turning angle range permitted for each of the wheels 91 to 94 is determined according to the turning angle limit value θ1_lim-θ4_lim of each unit. The range obtained by rotating this turning angle range 90 degrees toward the turning center C becomes the turning center setting range A1 to A4 of each unit.

The upper diagram in FIG. 13 illustrates an example of a left turn in which the turning angle limit value θ2_lim of the right front wheel 92 is smaller than the turning angle limit values of the other wheels 91, 93, and 94. The turning center setting range A2R for the right front wheel 92 turning to the right is symmetrical to the turning center setting range A2. Moreover, the ranges of the matte hatching for the turning center setting ranges A3, A4 of the rear wheels 93, 94 are omitted halfway.

The turning center setting ranges A1 to A4 are communicated between the units as drive limit information for the turning steering actuators 71 to 74. The range where the turning center setting ranges A1 to A4 of each unit overlap (the cross-hatched range in the figure) is defined as a turning center common setting range Acom. The turning center setting sections 661 to 664 of each unit set the turning center C within the turning center common setting range Acom. The turning angle calculation sections 671 to 674 calculate the turning angle command values θ1* to θ4* based on the turning center C.

As shown in the lower diagram of FIG. 13, the steering angle θh when the turning center is set at point Acom_max where the absolute value of the turning angle in the turning center common setting range Acom is maximum becomes the steering angle limit value θh_lim. The reaction force actuator control unit 56 limits the absolute value of the steering angle θh to the steering angle limit value θh_lim or less.

In the second embodiment, the turning center setting range A1 to A4, which is set in accordance with the turning angle limit value θ1_lim-θ4_lim of each unit, is used as drive limit information for the turning actuators 71 to 74, and a plurality of turning actuator control units 601 to 604 cooperate to limit the drive of the turning actuators 71 to 74. Therefore, the steering angle ratio according to the Ackermann theory can suppress running resistance during turning while ensuring appropriate vehicle controllability. Furthermore, since the turning center setting sections 661 to 664 are provided separately for each unit, it is possible to avoid the risk of the turning center setting function failing all at once for all the units.

Figure 14:
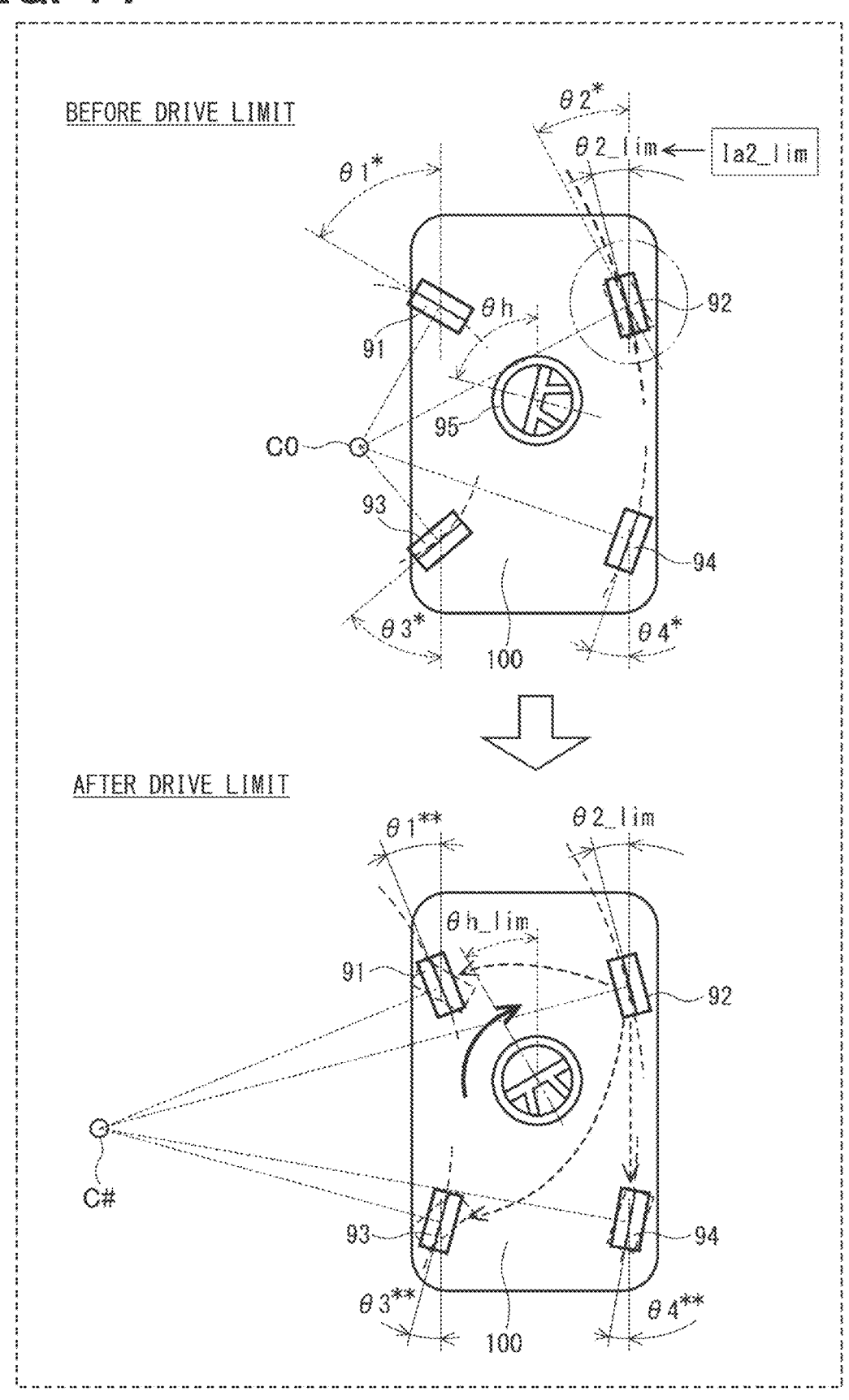
FIG. 14 is a diagram showing an example of a limiting operation of a turning angle and a steering angle by communication of drive limit information.

An example of the limiting operation of the turning angle and the steering angle based on the communication of drive limit information including communication between units in the second embodiment will be described with reference to FIG. 14. In contrast to the operation example of the first embodiment shown in FIG. 8, the operation example of FIG. 14 assumes a situation in which, when drive is limited by the FR unit, the four wheels 91 to 94 are turned independently in accordance with the Ackermann geometry to make a left turn.

Before the drive limit, the steering angle command values $\theta1*–\theta4*$ for the wheels 91-94 are calculated using the turning center C0 that is set based on the vehicle operation to be realized. The imaginary state in which the right front wheel 92 is steered according to the command value $\theta2*$ is shown by the dashed line. However, based on the turning angle limit value $\theta2\_lim$ of the FR unit, the state indicated by the solid line becomes the limit turning angle of the right front wheel 92. When the vehicle 100 were to turn in this state, that is, with only the right front wheel 92 restricted from turning while the other wheels 91, 93, 94 are not restricted from turning, the vehicle 100 would be in an uncontrollable state.

In order to avoid this situation, the turning center setting range determined in accordance with the turning angle limit value $\theta2\_lim$ is communicated from the turning actuator control unit of the FR unit to the turning actuator control units of the other units as drive limit information for the turning actuators 71 to 74. The turning actuator control units of the FL, RL and RR units communicate with each other and set the turning center after limit C# within the turning center common setting range of all the units. Then, the turning actuator control units of the FL, RL, and RR units calculate the turning angle command values $\theta1$, $\theta3$, and $\theta4**$ of their own units after the drive limit.

As a result, the turning angle command values of all units are reset according to the Ackermann geometry using the turning center after limit C# in accordance with the turning angle limit value $\theta2\_lim$ of the FR unit. Furthermore, the turning center setting sections 661 to 664 determine the turning center setting range based on the turning angle limit values $\theta1\_lim-\theta4\_lim$. The absolute value of the steering angle $\theta h$ is limited to be equal to or less than the steering angle limit value $\theta h\_lim$ calculated based on the turning center setting range. Therefore, even if the drive current of the turning actuator in some units is limited, vehicle controllability is ensured, and vehicle 100 can achieve stable turning operation.

Modified Example of Second Embodiment

Figure 15:
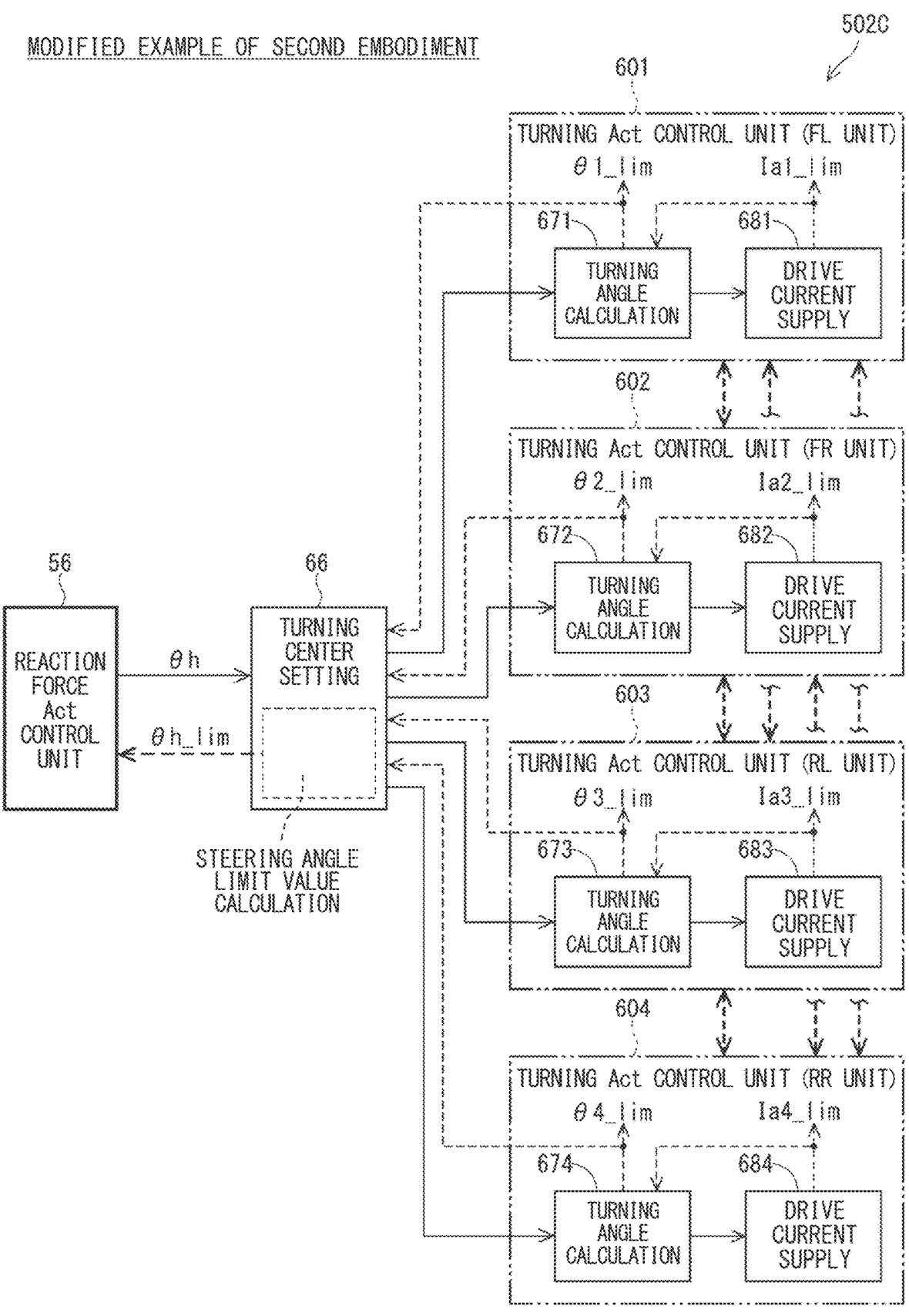
FIG. 15 is a block diagram of a turning control device according to a modified example of the second embodiment.

As shown in FIG. 15, in a turning control device 502C according to a modified example of the second embodiment, one turning center setting section 66 is provided in common to the turning actuator control units 601 to 604 of the respective units. In other words, the turning center setting section 66 is provided outside the turning actuator control units 601 to 604 of each unit.

The turning center setting section 66 sets the turning center C based on the vehicle operation to be realized, and issues a command to the turning angle calculation sections 671-674 of each unit. Furthermore, the turning center setting section 66 determines a turning center common setting range based on the turning angle limit values $\theta1\_lim-\theta4\_lim$ notified from the turning angle calculation sections 671 to 674 of the respective units. With this configuration, the same effects as those of the second embodiment can be obtained. Furthermore, by consolidating the turning center setting functions into one turning center setting section 66, efficient calculations are possible.

Other Embodiments (a) The turning control device disclosed herein is not limited to four-wheel vehicles, but can also be applied to three-wheel vehicles, or six-wheel or eight-wheel independently steering vehicles having three or more rows of left and right wheel pairs in the longitudinal direction of the vehicle. In summary, the turning control device of the present disclosure is applied to "a vehicle in which three or more wheels that are not mechanically restrained from one another can be steered independently."

(b) The turning actuators 71 to 74 are not limited to dual-system three-phase brushless motors, and may be configured as single-system polyphase motors, DC motors, linear actuators, or the like.

(c) Each of the wheels 91 to 94 need only be capable of being turned independently and does not have to be driven independently. For example, the front wheels 91, 92 may be drive wheels, and the rear wheels 93, 94 may be driven wheels.

The present disclosure should not be limited to the embodiment described above. Various other embodiments may be implemented without departing from the scope of the present disclosure.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A turning control device for controlling a turning of each wheel in a vehicle in which three or more wheels that are not mechanically restricted from each other are turned independently, the turning control device, comprising:

a plurality of turning actuator control units provided in correspondence with a plurality of turning actuators for turning each wheel, and configured to control a drive current applied to the turning actuators so that a turning angle output by the turning actuator becomes desired value; and a reaction force actuator control unit configured to control a drive of a reaction force actuator that applies a reaction force torque against a steering of a driver to a steering wheel in a steering mechanism of a steer-by-wire system that is provided mechanically separated from the turning actuator;

wherein the plurality of turning actuator control units and the reaction force actuator control unit communicate a drive limit information which is information regarding a drive limit of the turning actuator or the reaction force actuator, and limit the drive of the turning actuator and the reaction force actuator based on the drive limit information.

2. The turning control device according to claim 1, wherein a limit angle at which a steering wheel can be steered by a torque of a driver, or the limit angle at which a steering angle signal proportional to a steering wheel operation angle of the driver can be output, is defined as a steering angle limit value, and in the plurality of turning actuator control units, the steering angle limit value calculated based on the drive limit information of each of the turning actuators is communicated from the plurality of turning actuator control units to the reaction force actuator control unit as a drive limit information of the reaction force actuator.

3. The turning control device according to claim 2, wherein the steering angle limit value is calculated based on a current limit value of drive current of each turning actuator.

4. The turning control device according to claim 2, wherein the steering angle limit value is calculated based on a turning angle limit value of each turning actuator.

5. The turning control device according to claim 4, wherein the turning actuator control unit stores a drive current vs. an actual turning angle map that specifies a relationship between the drive current of the turning actuator and the actual turning angle of the wheels for each of one or more load ranges that are divided according to a magnitude of a load, and a current limit value vs. a turning angle limit value map that specifies the relationship between the current limit value of the drive current of the turning actuator and the turning angle limit value for each of the load ranges, determines the load range using the drive current vs. the actual turning angle map based on the drive current applied to the turning actuator and the detected actual turning angle, and calculates the turning angle limit value corresponding to the current limit value in the determined load range using the current limit value vs. the turning angle limit value map.

6. The turning control device according to claim 2, wherein each of the turning actuator control units calculates a turning angle command value for each wheel so that a turning direction of each wheel is perpendicular to a line connecting a turning center, which is set based on a vehicle operation to be realized, and a center of each wheel, and in a configuration in which a turning center setting range corresponding to an allowable turning angle range of each wheel is determined according to a steering angle limit value of each of the turning actuators, the steering angle limit value is calculated based on the turning center setting range.

* * * * *